Sept. 4, 1928.  1,683,306
C. E. RYAN ET AL
ATTACHMENT FOR MOTOR VEHICLES
Filed Oct. 12, 1925  5 Sheets-Sheet 1
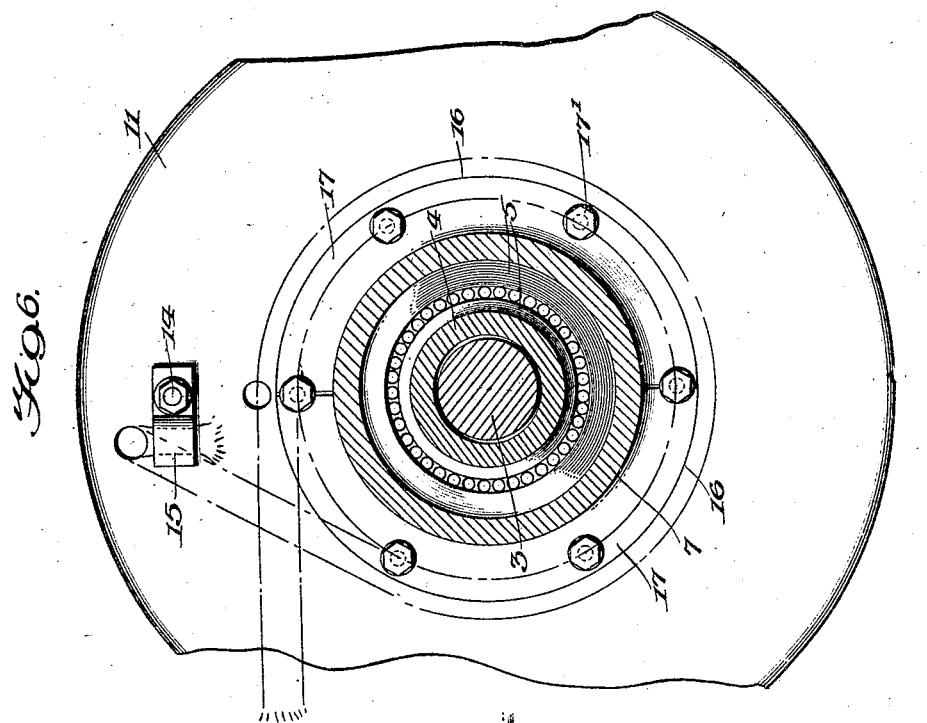
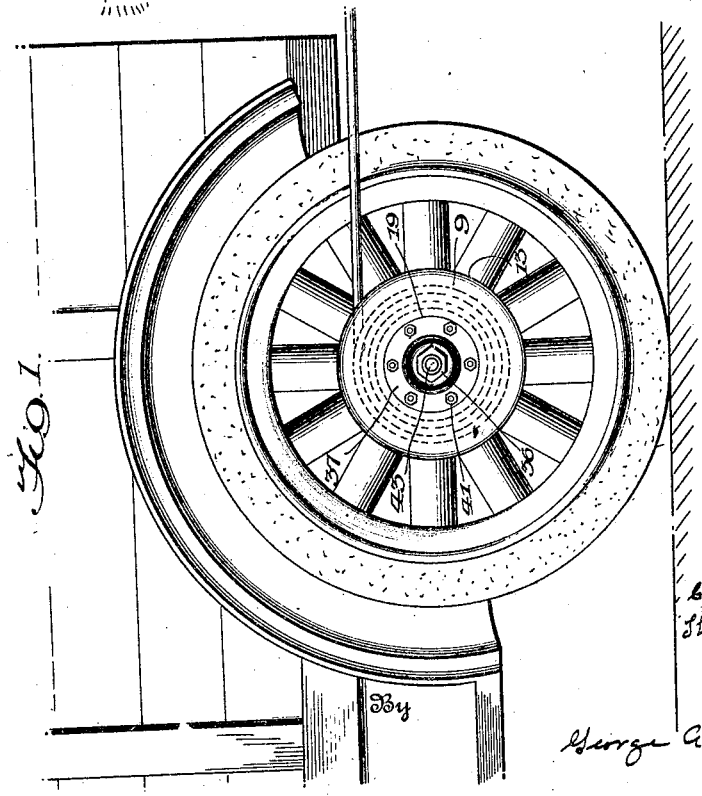
Inventors
Charles E. Ryan
Thomas J. Schutz
By George A. Prevost
Attorney

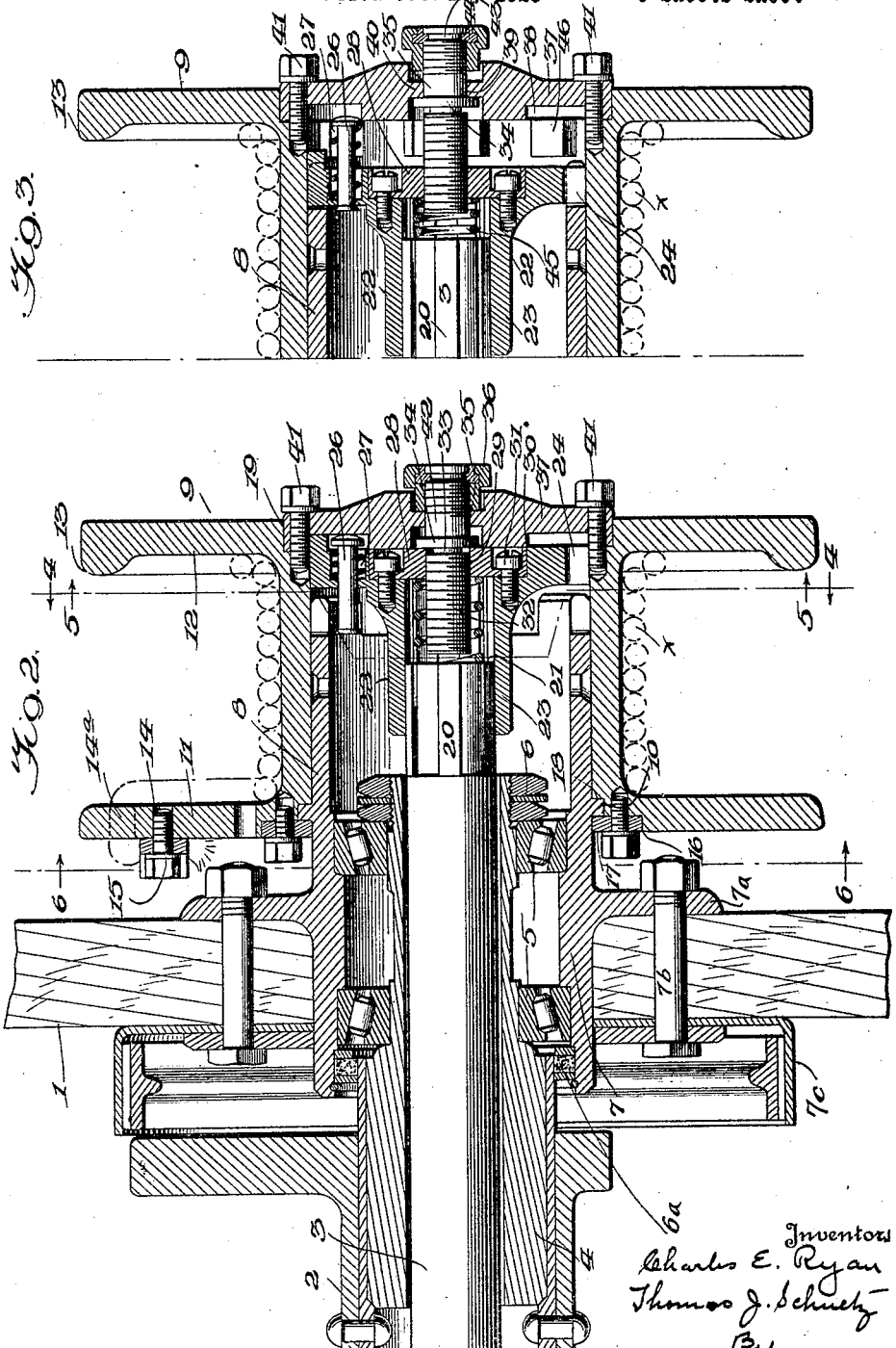

Sept. 4, 1928.
C. E. RYAN ET AL
1,683,306
ATTACHMENT FOR MOTOR VEHICLES
Filed Oct. 12, 1925
5 Sheets-Sheet 3
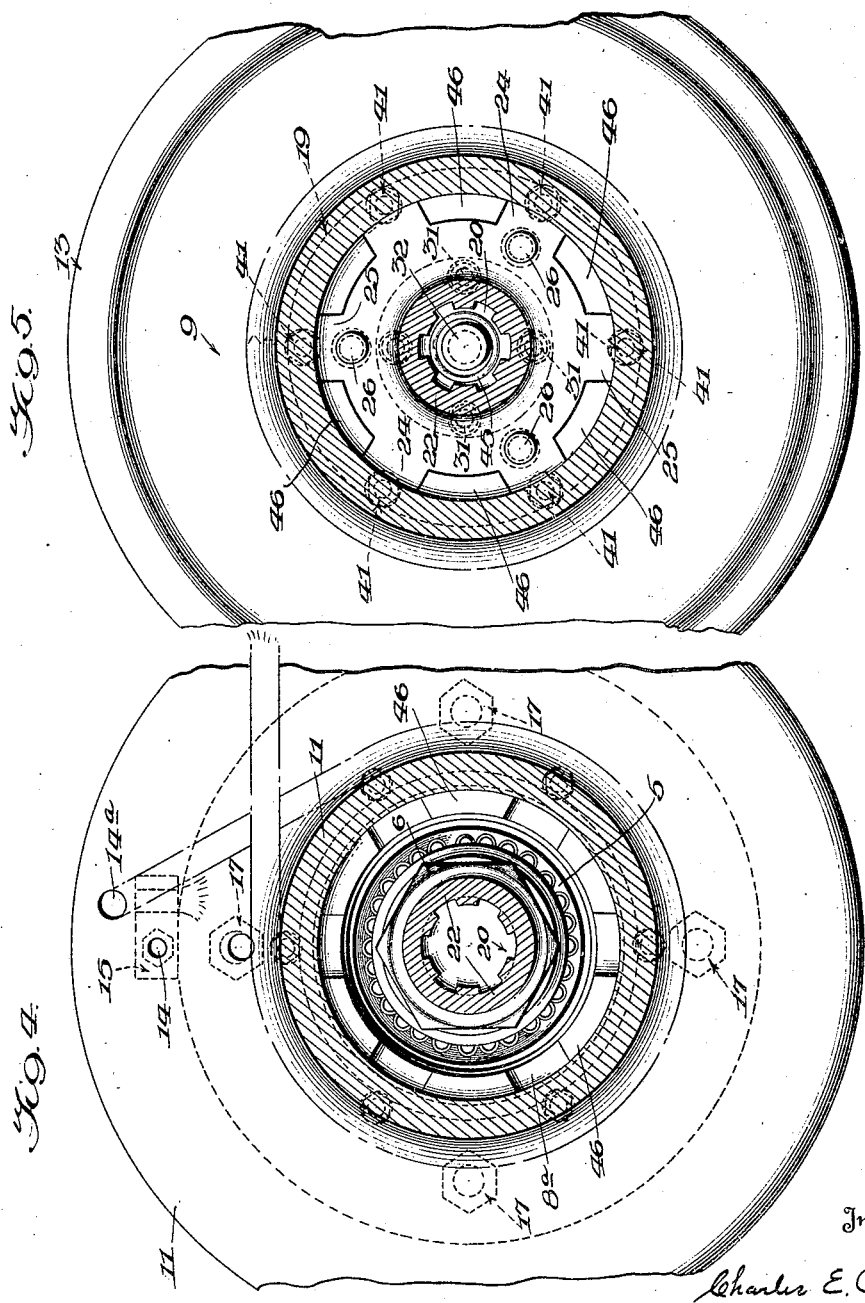
Inventors
Charles E. Ryan
Thomas J. Schultz
By George A. Prvost
Attorney Sept. 4, 1928.  1,683,306
C. E. RYAN ET AL
ATTACHMENT FOR MOTOR VEHICLES
Filed Oct. 12, 1925  5 Sheets-Sheet 4
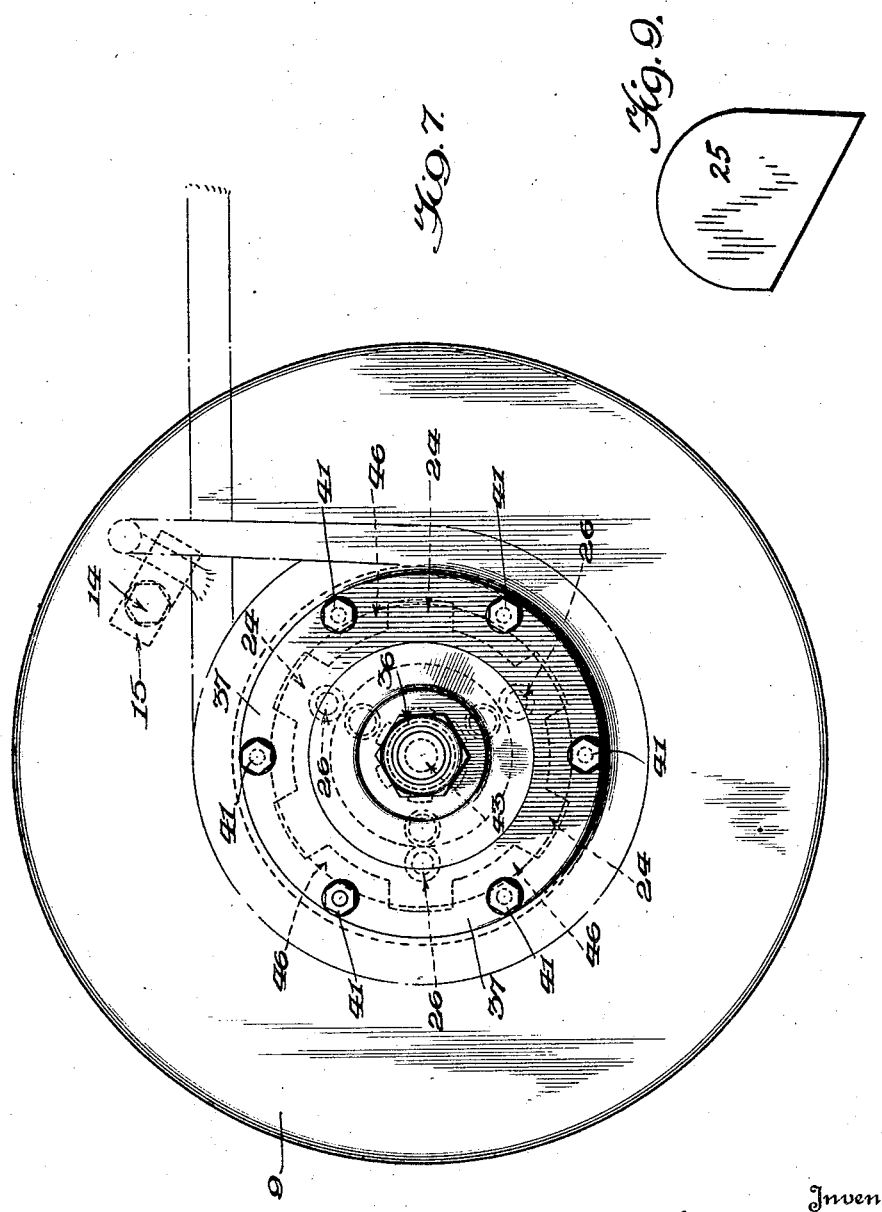
Inventors
Charles E. Ryan
Thomas J. Schnetz
By George A. Prevost
Attorney

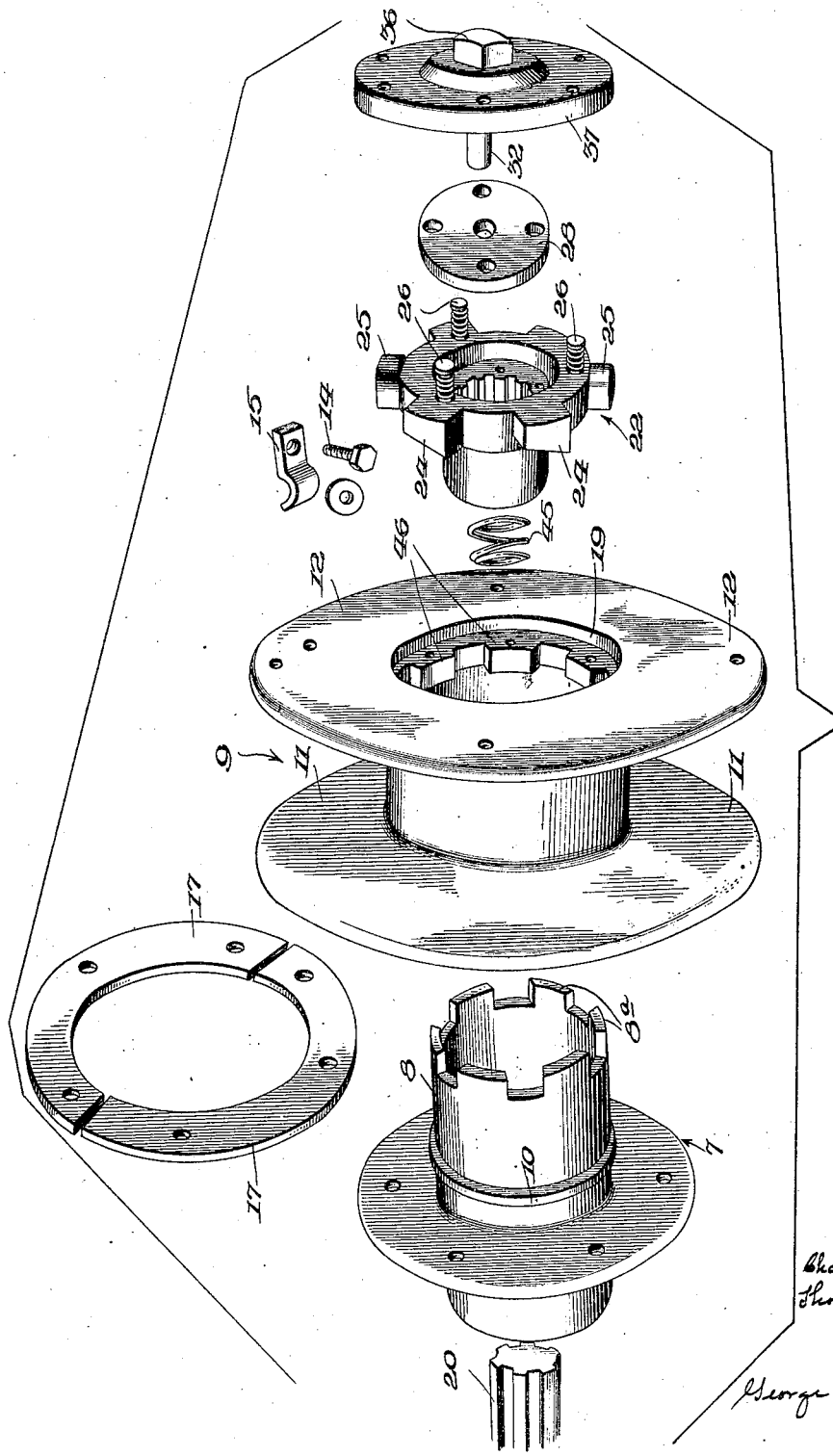

Patented Sept. 4, 1928.

1,683,306

UNITED STATES PATENT OFFICE.

CHARLES E. RYAN AND THOMAS J. SCHUETZ, OF TULSA, OKLAHOMA.

ATTACHMENT FOR MOTOR VEHICLES.

Application filed October 12, 1925. Serial No. 62,065.

Our invention relates to new and useful improvements in driving means adapted to be connected to the axle housing, shaft and driving wheels of an automobile or other motor driven vehicles and to be driven by said axle shaft, whereby it is possible to operate mechanism from the driving means connected with said axle without necessitating the jacking of the rear end of the automobile or other vehicles, this invention being an improvement on the Letters Patent No. 1,535,255, granted to C. E. Ryan on April 28, 1925.

A further object of our invention is to provide a toothed sliding clutch adapted to alternately engage the cable drum and the wheel, certain of the clutch teeth being provided with angular faces and others with angular and arc-shaped faces to facilitate said engagement.

A further object of our invention is to provide for free lateral movement of the operating screw to allow the compression springs to function in such a manner as to further facilitate the engagement of the parts.

A still further object is to provide means whereby the cable will be prevented from spooling up in single wraps against one side wall of the cable drum.

With the above and other objects in view which will appear as the description proceeds our invention consists in the novel features herein set forth illustrated in the accompanying drawings and more particularly pointed out in the appended claims.

Referring to the drawings in which numerals of like character designate similar parts throughout the several views, Fig. 1 is a view showing our improved device attached to the rear wheel of an automobile, Fig. 2 is a horizontal sectional view through the entire construction, showing the clutch in engagement with the drum teeth, Fig. 3 shows the clutch in engagement with the hub teeth, Fig. 4 is a sectional view taken on line 4—4 of Fig. 2, Fig. 5 is taken on line 5—5 of Fig. 2, Fig. 6 is taken on line 6—6 of Fig. 2, Fig. 7 is an end view of the assembled device, Fig. 8 shows a detail perspective view of each of the parts of the device, and Fig. 9 is a detail end view of one of the combined angular and radial faced teeth of the clutch.

In the drawings 1 designates an ordinary driving wheel of an automobile, 2 the rear axle housing and 3 the axle shaft. Within the housing 2 and secured thereto in any suitable manner, we provide a spindle 4 which surrounds the shaft 3. This spindle is cylindrical in shape and reduced at its outer end to a suitable diameter to accommodate the application of roller, tapered or other bearings 5. The end of the spindle 4 is threaded to receive the lock nuts and washer 6. An oil sealing means or ring $6^a$ is arranged between the spindle and the wheel hub.

7 represents the projecting hub which functions as a wheel mounting and projects outwardly beyond said wheel for a suitable length to serve as a bearing 8 for the drum 9 or any other appliance rotatably mounted thereon. The inner end of the bearing 8 is provided with an integral flange 10 which will be referred to later, while the outer end is recessed to form a plurality of circumferentially extending longitudinal teeth $8^a$. The hub is also provided with a flange $7^a$ which carries bolts $7^b$ employed to secure the brake drum $7^c$ and wheel to the hub, The drum 9 comprises two parallel side walls 11 and 12 which extend circumferentially thereof, the inner wall 11 being straight and the outer wall 12 being provided with an inwardly projecting baffle ring 13 adapted to prevent the spooling up of the cable in a single wrap. The inner wall 11 is bored and threaded at 14 to receive a cable clamp 15 and provided with an aperture $14^a$ through which the end of the cable may be passed for engagement with said clamp 15.

16 designates a recess in the wall 11 for receiving a retaining ring 17, and 18 is an adjoining deeper, reduced recess for the flange 10 on the bearing 8.

The wall 12 is recessed at 19 for purposes hereinafter set forth.

The interior of the drum 9, adjacent the recess 19, is provided with a plurality of circumferentially extending lateral teeth 46, adapted to register with the teeth $8^a$ of the drum bearing or projected hub 8.

The end of the shaft 3 is splined as at 20 to register with the longitudinal grooves 21 in the reduced elongated part 23 of the clutch member 22. The periphery of the enlarged portion of the clutch member is provided with a plurality of lateral projecting teeth 24 having angular or beveled inner faces as shown in Fig. 8. Two of these teeth are provided with arc shaped outer faces 25 in addition to the angular inner faces, as clearly shown in Fig. 9, the object of these special faces being hereinafter referred to.

At predetermined points around the outer face of the clutch member, are inserted a plurality of spring actuated ejector pins 26 which fit in recesses 27 in said clutch and are retained in place by any suitable means. A plate 28 provided with a centrally located inwardly threaded aperture is adapted to be held in place in the recess 30 in the outer face of the clutch by screws 31.

42 designates a draw screw comprising a screw threaded member 32 adapted to engage the aperture 29 in the plate 28, a reduced portion 33, a circumferential flange 34 and an outer screw threaded member 35 to receive an adjusting nut 36.

An outer plate 37, recessed upon its inner face as at 38 to receive the radial teeth 25 and the heads of the ejector pins 26 and centrally bored at 39 to receive the draw screw 42, having a flange 40 extending inwardly around said aperture 39 for abutting the flange 34 on the draw screw is adapted to fit in the recess 19 in the outer side of the drum 9 and to be secured in place over the clutch member by screws 41.

The outer threaded portion 35 of the draw screw 42 is provided with a circumferential recess 43 adapted to cooperate with a circumferential recess 44 in the nut 36. These recesses are slightly out of alignment with each other and when the nut 36 is screwed on the end 35 of the draw screw 42 until the outer faces of each are even, melted bronze or other suitable metal is poured into said recesses, which renders it impossible to unscrew the nut 36.

Having thus fully described the construction and arrangement of parts of our invention, the next to be considered is its assembly and operation.

The spindle 4 is applied to any solid or semi-floating axle housing. The projecting hub 7 replacing the usual hub, is secured within the wheel 1, forming a mounting therefor. The first bearing 5 is then slipped on the reduced portion of the spindle. The hub and wheel are brought into place and the second bearing 5 inserted, after which the lock nuts and washers are applied.

The drum 9 is then pushed on the bearing portion 8 of the hub until the recess 18 in said drum abuts the flange 10 on the bearing 8. The split retaining ring 17 is then secured in the recess 16, which prevents said drum from coming off of the bearing 8.

The clutch 22 is then placed on the end of the shaft 3, the splines 20 in the latter engaging the grooves 21 therein. A coil spring 45 is inserted within the clutch under compression (its inner end abutting the end of the shaft 3 and its outer end abutting the inner surface of the plate 28 which is secured to the clutch. The outer plate 37 with the draw screw applied thereto is then bolted on the drum, depressing the ejector pins 26 against their springs.

The end of the cable X is passed through the aperture 14ª in the inner wall 11 of the drum from the inside and brought down at right angles and engaged by the cable clamp 15.

By turning the nut 36 with a suitable wrench in counter clockwise direction the clutch is forced inwardly, due to the pressure exerted by the ejector pin springs, until the angular faces of the clutch teeth abut the outer faces of the corresponding hub teeth. This counter clockwise movement is continued until the flange 34 on the draw screw abuts the flange 40 in the aperture 39, at which time the springs on the ejector pins are fully retracted, exerting a continuous pressure against plate 37 tending to push the clutch member inwardly. The drum is then turned forward by hand until the teeth 24 in said clutch due to their angular inner faces, find their way into alignment with the teeth 8ª in the end of the bearing member 8 of the projecting hub, when the springs of the ejector pins will cause them to engage. The draw screw is again turned in counter clockwise direction until the aforesaid engagement is complete. As the teeth engage, the ejector pin springs are released and the spring 45 in the clutch is compressed as clearly shown in Fig. 3.

In this position of the parts the power driven shaft will cause the rotation of the clutch which in turn rotates the rear wheel of the vehicle through the medium of the projected hub 7.

The drum is locked from free rotation by the outward pressure of the flange 34 against the plate 37.

Now to cause the clutch to disengage the wheel and operate the drum the draw screw is turned in clockwise direction, which movement releases the outward pressure on the plate 37, the clutch being forced outwardly by the spring 45 until the radial clutch teeth 25 abut the corresponding drum teeth 46. The drum is then turned by hand in either direction until the arc shaped faces of the clutch teeth find their way into alignment with said drum teeth, when the clutch is forced outwardly by the spring 45 and with it the draw screw, until the flange 34 abuts the flange 40.

This clockwise movement is continued until the engagement is complete and the shoulder of the nut on the draw screw abuts the outer edge of the flange 40 and locks the mechanism.

The shaft 3 will now rotate the clutch which in turn will operate the drum free from the wheels, thus avoiding the necessity of jacking the rear wheels of the vehicle.

From the foregoing it is believed that our invention may be clearly understood without further description, it being borne in mind that numerous changes may be made in the details of construction without departing from the spirit of invention as disclosed in the following claims.

What we claim and desire to secure by Letters Patent is:

1. A mechanical movement comprising a driving member, two driven members, means whereby said driving member will alternately engage each of said driven members and spring actuated means whereby the engaging parts of said driving member and driven members will automatically become in alignment for all relative positions of the parts.

2. In combination with a motor driven vehicle, a projected hub provided with a series of teeth, secured to the driving wheel of said vehicle, a drum rotatably mounted on one end of said hub also provided with a series of teeth, a toothed clutch mounted on the driving shaft of said vehicle, means for causing said clutch to alternately engage the hub teeth and disengage the drum teeth, and engage the drum teeth and disengage the hub teeth and means whereby said teeth will automatically become in alignment for all relative positions of the gear teeth.

3. In combination with a motor driven vehicle, a projected hub provided with a series of teeth, secured to the driving wheel of said vehicle, a drum rotatably mounted on one end of said hub also provided with a series of teeth, a toothed clutch mounted on the driving shaft of said vehicle, means for causing said clutch to alternately engage the hub teeth and disengage the drum teeth, and engage the drum teeth and disengage the hub teeth, spring means for causing said teeth to automatically become in alignment with either the drum teeth or hub teeth, the abutting faces of said clutch teeth being so formed as to facilitate said alignment.

4. In combination with a motor driven vehicle, a projected hub provided with a series of teeth, secured to the driving wheel of said vehicle, a drum rotatably mounted on one end of said hub also provided with a series of teeth, a toothed clutch mounted on the driving shaft of said vehicle, means for causing said clutch to alternately engage the hub teeth and disengage the drum teeth, and engage the drum teeth and disengage the hub teeth, and spring actuated means for automatically causing said teeth to become in alignment.

5. In combination with a motor driven vehicle, a projected hub adapted to serve as a wheel mounting and drum bearing, one end of said hub being provided with a series of teeth, a drum rotatably mounted on said bearing and also provided with a series of teeth, a toothed clutch mounted on the driving shaft of said vehicle means for causing said clutch to alternately engage the hub teeth to rotate the wheel and disengage the drum teeth, and engage the drum teeth to rotate the drum on the bearing and disengage the hub teeth, and means whereby said teeth will automatically become in alignment.

6. In combination with a motor driven vehicle, a projected hub secured to the driving wheel of said vehicle and forming a mounting therefor, one end of said hub forming a drum bearing, a drum rotatably mounted on said bearing, means connected with the driving shaft of said vehicle for alternately driving the wheel free from operative relation with the drum and the drum free from the wheel and means for securing a cable to said drum.

7. In combination with a motor driven vehicle a projected hub secured to the driving wheel of said vehicle, forming a wheel mounting therefor, one end of said hub forming a drum bearing, a series of circumferentially extending teeth in one end of said bearing, a drum rotatably mounted on said bearing and also provided with a series of circumferentially extending teeth, a driving shaft splined at one end passing through said wheel mounting, and projecting within said drum bearing, an internally grooved and externally toothed clutch adapted to engage said splined end and to be rotated thereby, a draw screw and spring actuated means for causing said clutch to alternately engage the hub teeth and disengage the drum teeth, and engage the drum teeth and disengage the hub teeth.

8. In combination with a motor driven vehicle, a projected hub secured to the driving wheel forming a mounting therefor, one end of said hub forming a drum bearing, a drum rotatably mounted on said bearing, means for retaining said drum thereon, the outer end of said bearing being provided with a series of circumferentially extending teeth a splined driving shaft extending through said wheel and within said bearing, a clutch member comprising a series of internal grooves adapted to register with said splines and a series of external teeth adapted to register with said hub teeth, a plurality of spring actuated ejector pins at predetermined points in said clutch, said drum being provided with a series of internal circumferentially extending teeth also adapted to be engaged by said clutch teeth, a centrally apertured plate secured to said drum and covering said clutch member, depressing said ejector pins, means passing through said plate and cooperating with said clutch to cause the latter to engage the hub teeth and disengage the drum teeth, and engage the drum teeth and disengage the hub teeth, a spring within said clutch abutting the end of said splined shaft adapted to force said clutch outwardly, said spring and said spring actuated ejector pins being adapted to automatically cause said clutch teeth to become in alignment with said hub and said drum teeth.

9. The combination as claimed in claim 8 wherein certain of said clutch teeth are provided with a combination of angular and arc-shaped faces, said teeth coacting with said clutch spring and ejector pins to automatically cause the clutch to engage the hub and drum teeth.

10. The combination as claimed in claim 8 wherein the operating means comprises a draw screw threaded at both ends, and reduced intermediate the two ends provided with a circumferential flange, the outer end of said draw screw being adapted to receive an adjusting nut, and means whereby said nut may be permanently secured thereto.

11. In combination with a motor driven vehicle, a projected hub secured to the driving wheel of said vehicle and forming a mounting therefor, one end of said hub forming a drum bearing, a drum rotatably mounted on said bearing, and means connected with the driving shaft of said vehicle for alternately driving the wheel free from operative relation with the drum and the drum free from the wheel.

12. A mechanical movement comprising a driving shaft, a toothed clutch slidably mounted thereon and adapted to be rotated thereby, two toothed driven members, spring actuated means for causing said clutch to slide on said shaft to alternately engage and operate each of said driven members, each of said clutch teeth having one face beveled and at least one of said clutch teeth having an opposite arc-shaped face whereby said spring actuated means will cause said clutch to automatically slide into engagement with either of said driven members.

13. In a motor driven vehicle, the combination of a rear axle, a road wheel rotatable about the axis of said axle, and having a body and a projecting flange, a pulley coaxial with the axle, means for driving the wheel or the pulley from the axle, a brake drum, and means for securing the body of the wheel and the brake to said flange.

14. In a motor driven vehicle, the combination of a rear axle, a road wheel rotatable about the axis of said axle and having a hub, a pulley coaxial with the axle and rotatably mounted on said hub, means for driving the wheel or the pulley from said axle, a spindle surrounding the axle, and an oil sealing ring between the hub and spindle.

15. In a motor driven vehicle, the combination of a rear axle, a road wheel rotatable about the axis of said axle and including a hub provided with an extension, a spindle surrounding the axle and projecting into the hub, an oil sealing ring arranged between the hub and spindle, thrust bearings arranged between the hub and spindle, a pulley rotatably mounted on the extension of the hub, and means for driving the wheel or pulley from the axle.

16. In a motor driven vehicle, the combination of a rear axle, a road wheel rotatable about the axis of said axle and having a hub provided with an extension, said extension being provided with clutch teeth, a pulley rotatably mounted on the hub extension and provided with clutch teeth, an axially movable toothed clutch adapted to engage the clutch teeth of the extension or the clutch teeth of the pulley for driving either the wheel or pulley from the axle, a control member for moving the clutch in opposite directions, and auxiliary means for automatically moving the clutch in opposite directions to facilitate the engagement of the clutch with the clutch teeth of the hub extension or the clutch teeth of the pulley.

17. In a motor driven vehicle, a combination as claimed in claim 16, in which the teeth of the clutch are provided on one side with bevelled faces, the opposite side of at least one of the teeth of the clutch being arc-shaped.

18. In a motor driven vehicle, the combination of a rear axle, a road wheel rotatable about the axis of said axle, a pulley coaxial with the axle, means including a clutch for driving the wheel or pulley from the axle, a propelling screw for moving the clutch, and means for positively locking the screw to the pulley to prevent the screw from accidentally detaching itself from the pulley.

19. In a motor driven vehicle, the combination of a rear axle, a road wheel rotatable about the axis of said axle, a pulley coaxial with the axle, means including a clutch for driving the wheel or pulley from the axle, a propelling screw for moving the clutch, said screw being axially movable relatively to the pulley, and means for positively locking the screw to the pulley to prevent the screw from accidentally detaching itself from the pulley.

In testimony whereof we affix our signatures.

CHARLES E. RYAN.
THOMAS J. SCHUETZ.